Patented May 18, 1926.

1,585,240

UNITED STATES PATENT OFFICE.

HENNING GUSTAV FLODIN, OF ROSLAGS-NASBY, AND EMIL GUSTAF TORVALD GUSTAFSSON, OF STOCKHOLM, SWEDEN, ASSIGNORS TO HAMPUS GUSTAF EMRIK CORNELIUS, OF STOCKHOLM, SWEDEN.

METHOD OF PRODUCING IRON AND THE LIKE WITH A CERTAIN PERCENTAGE OF CARBON DIRECTLY OUT OF IRON ORE OR THE LIKE.

No Drawing.   Application filed April 7, 1925. Serial No. 21,411.

The present invention refers to a method of producing iron and other carbon binding metals and alloys thereof with a certain percentage of carbon, directly out of their oxide ores, with carbon as a reducing agent, alone or, if desired, together with other reducing agents, such as ferro-silicon, ferro-manganese or aluminum.

It has been previously proposed for the manufacture of metals with a certain percentage of carbon, to reduce and to melt briquettes of ore and carbon, in a suitable proportion for reduction of the metal oxides and for the desired percentage of carbon in the metal produced. However, in the manufacture of iron, for example, the point is to produce iron or steel with different percentages of carbon. In such case, consequently, a special charge must be prepared for every percentage of carbon, which obviously involves a number of charges differently composed. It has also been found rather difficult or complicated in the above stated manner alone to control the percentage of carbon within those comparatively narrow limits which frequently have to be maintained, as by concurring circumstances, for instance too high a percentage of water in the briquettes, part of the carbon in the charge may readily be consumed for other purposes than intended.

The present invention relates to a method, whereby the production of iron and other carbon binding metals and alloys thereof with different percentages of carbon, directly out of their oxide ores, is greatly facilitated, and the invention consists in that a charge, low in carbon, of briquettes or pieces containing ore and carbon in a suitable proportion for the reduction of the oxide ore and for the carbon required in the metal produced therefrom, and a charge, richer in carbon, of briquettes or other pieces, are reduced and melted in a furnace, the two charges being either admixed or in any sequence to each other, the quantities of the different charges being so proportioned that a final product holding the desired percentage of carbon is obtained.

The charge which is richer in carbon may then consists of carbon, such as charcoal, coke, peat coke or anthracite, which is fed into the furnace directly onto the slag bath forming in the reduction and melting process. The carbon should not then be too finely grained, as it will otherwise be carried away from the furnace by the gases forming in the reduction process. The carbon resting on the slag will then always reduce and bind a greater or smaller portion of the metal oxides contained in the slag into metal which will sink and carbonize the metal in the bottom of the furnace. The carbon may also, by direct contact with the charge floating on the slag, bind the metal reduced therefrom. It should be understood that with a suitable composition of the charge and the slag, and with briquettes, made with an adequate pressure, the pieces of the charge do not sink down through the slag bath, but remain floating on the top thereof.

Instead of carbon as the charge which is richer in carbon, it is also possible to use briquettes or pieces containing ore and carbon so proportioned that a metal relatively rich in carbon may be obtained therefrom.

The charge which is low in carbon is preferably prepared in such manner that the ore is crushed to a fine degree (granulated) and intimately mixed with finely divided carbon or carboneaceous material and, if required, with other reducing agents, in suitable proportion for the reduction of the oxides and for the carbon in the metal produced from the charge, and the mixture transferred thereafter into the form of briquettes or other pieces with the positions of the particles of the constituents fixed relatively to each other. In order to facilitate the procedure of transferring the material into the form of briquettes or other pieces, a binding agent is preferably added to the mixture. When using a binding agent or a carbonaceous material containing a large percentage of water, the mixture should be dried to a larger or smaller extent prior to briquetting. Preferably, the briquettes or pieces produced are also subjected to a hardening or drying process in air or other atmosphere, before they are fed into the furnace.

The charge which is richer in carbon may also be prepared in the manner hereinbefore indicated, but this is not necessary, in that the charge required for instance in the production of pig iron need not be so accurately mixed as the charge which is low in carbon, it being very much easier to produce pig iron than soft iron directly out of ore.

In carrying out the method in practice, preferably, a certain quantity of a charge which is low in carbon, adequate, for instance, for producing iron which is poor in carbon (0.05–0.10% C.), and a certain quantity of a charge containing carbon, adequate, for instance, for producing pig iron, are first reduced and melted. Thus it will be very easy to produce an iron with the desired percentage of carbon by reducing said charges in suitable proportion either admixed or in any arbitrary sequence. Tests of the metal produced can easily be made during the operation, and by further adding quantities of one charge or the other, the percentage of carbon of the product can be controlled to a fine degree. If it is found that for some reason or other, the percentage of carbon of the metal is too high, the same may also be reduced by feeding ore into the furnace. The heavy pieces of ore will then sink down through the slag and remove from the molten metal an amount of carbon corresponding to the oxygen in the ore. Obviously, slag forming substances should be added simultaneously with the admixture of the ore, if the gangue contained in the ore is apt to yield an unsuitable composition of slag.

When adding the charge which is richer in carbon, if desired with carbon added, and when using an electric furnace with carbon electrodes, the charge should preferably be deposited on top of the slag bath adjacent the electrodes. Thus, in operating with a resistance in the furnace, that is to say with one or more of the electrodes dipping into the slag, the corroding influence of the said charge on the electrodes will be greatly reduced and, consequently, the consumption of electrode carbon is correspondingly lessened.

In carrying out melting in an electric furnace according to the method herein set forth it has been found very easy, for instance, first to produce an iron very low in carbon, with a percentage of carbon down to 0.02, and then to carbonize such iron with a charge richer in carbon and/or with carbon, up to any percentage of carbon, for example to 0.60 or 0.80%. It has also been possible to first produce an iron holding 1.40% of carbon and then, by reducing and melting a charge which is lower in carbon, to bring down the percentage of carbon of the final metal for instance to 0.30 or 0.20%.

A metal with a closely defined percentage of carbon may also be produced through using two different kinds of charges, by first producing in the furnace a metal with a percentage of carbon somewhat below that required in the final product, and then by carbonizing said metal in known manner either in the furnace or outside the same, for instance in a ladle, with a suitable quantity of carbon, for example, charcoal, coke or pig iron.

A portion at the least of the metal oxides, such as ferrous and/or ferric oxide, dissolved in the slag will be boiled out therefrom by adding, toward the end of charging, a charge which is richer in carbon, or carbons. The metal formed in the reducing process and which is richer in carbon will also deoxidize the metal previously obtained which is poorer in carbon and richer in oxygen. Such a method, i. e., where a charge which is richer in carbon, if desired, with carbon added, is reduced after a charge poorer in carbon, will therefore, when considering the quality, be found advantageous. The metal obtained may then be more completely deoxidized in the ordinary way, by adding deoxidizing substances, such as ferro-manganese, ferro-silicon or aluminum, in the furnace and/or when tapping is done.

However, in a method like the present one, deoxidation may also be suitably carried out, wholly or partly, by feeding into the furnace and by reducing therein, for a suitable length of time prior to tapping, briquettes or pieces prepared in the manner hereinbefore described, such briquettes or pieces consisting of finely divided ore of deoxidizing metal, such as manganese, mixed with finely divided carbon in a suitably adapted quantity. The reduced ferro-manganese, or the manganese, when pure manganese ore is used, will then expel the major portion of the metal oxides, particularly ferrous oxide, from the slag and the metal, and will thus aid toward a greater recovery of metal, as also toward obtaining a metal holding a lower percentage of oxygen and also of sulphur. It is evident that this method of deoxidation may be employed irrespectively of the mode of preparing the charge for the metal to be produced and independently of how the reduction of this metal is taking place.

With the use of sulphurous ore or of sulphurous carbon it has been found suitable, in preparing briquettes or pieces for the charge, to employ lime-white in one or both of the two charges that are respectively poorer and richer in carbon. By the addition of lime-white, proper binding is obtained through the uniform distribution in the charge, and besides, such addition of lime-white causes that the reduction and the melting of the charge gives a metal which is rather free from sulphur, in that the lime occurring as a film on the grains absorbs the sulphur in forming calcium sulphide, which calcium sulphide is absorbed by the slag. If in order to obtain a fluid and, consequently, readily distributed lime-white, a large quantity of water has to be added to the lime, it may be suitable, prior to briquetting the charge, which is preferably carried out with a certain content of water in the mixture suited to the nature of the mixture and to the amount of pressure used, to subject the mixture to drying in air or other atmosphere. It is very important, when adding lime-white or other watery admixtures, to subject the briquettes or pieces, after the preparation thereof, to thorough drying in air or other atmosphere, preferably some atmosphere holding carbonic acid, such as flue gas, before the briquettes or pieces are fed into the reduction furnace. It should be understood that if a considerable amount of water remains in the charge, the briquettes or pieces may readily burst through the violent development of water gas when feeding is effected onto the very hot slag bath, and even a lesser content of water will be found injurious, inasmuch as the steam produced will partly attack a portion of the carbon admixed with the charge, so as to form water gas, and partly the electrode carbon and cause corrosion thereof.

With the use of ore having a high or relatively high percentage of phosphorus, it is preferred, in order to obtain a final product with a satisfactory or low percentage of phosphorus, first to reduced and to melt in the furnace a charge which is low in carbon consisting of briquettes or pieces, and then to remove, wholly or partly, the phosphorous slag formed, and finally to reduce and to melt a suitable quantity of a charge which is richer in carbon, in order to attain the desired percentage of carbon in the final product. If the final product shall have a low percentage of phosphorus, it is preferred to use an ore which is poor in phosphorus in the latter charge as this always constitutes the minor portion of the entire charge employed.

Slag forming substances may be added, either when preparing the different kinds of charges, or, directly into the furnace, when reducing and melting the same, or on both of these occasions.

For carrying out the method, any type of furnace may be used, but the electric electrode furnaces are the most suitable.

In the description hereinbefore and in the appended claims the term "piece form" is understood to comprise pieces ranging in size from that of a grain up to larger pieces.

The invention is not limited to the metal or metals or to the binding agents or admixtures which have been referred to hereinbefore by way of example only, but comprises production, with the optional use of any suitable binding agent, in the manner set forth, of all metals capable of binding carbon and their alloys.

What we claim as new and desire to secure by Letters Patent of the United States of America is:—

1. A direct reduction process for producing carbon binding metal or metal alloy by charging a furnace with one charge consisting of a mixture of oxide ore and carbon in the proportion required for reduction and carbonization of the metal and with another charge containing relatively higher percentage of carbon and regulating the carbon to the percentage desired in the metal produced, through proportioning the two charges relatively to each other.

2. A direct reduction process for producing carbon binding metal or metal alloy by charging a furnace with one charge consisting of a solidified mixture of oxide ore and carbon in the proportion required for reduction and carbonization of the metal and with another charge containing relatively higher percentage of carbon and regulating the carbon to the percentage desired in the metal produced, through proportioning the two charges relatively to each other.

3. A direct reduction process for producing carbon binding metal or metal alloy by charging a furnace with one charge consisting of a solidified mixture of oxide ore and carbon and other reducing agent in the proportion required for reduction and carbonization of the metal and with another charge containing relatively higher percentage of carbon and regulating the carbon to the percentage desired in the metal produced, through proportioning the two charges relatively to each other.

4. A direct reduction process for producing carbon binding metal or metal alloy by charging a furnace with one charge consisting of a solidified mixture of oxide ore and carbon in the proportion required for reduction and carbonization of the metal and with another charge consisting of a similar solidified mixture containing relatively higher percentage of carbon and regulating the carbon to the percentage desired in the metal produced, through proportioning the two charges relatively to each other.

5. A direct reduction process for producing carbon binding metal or metal alloy by charging a furnace with one charge for producing metal low in carbon consisting of a solidified mixture of oxide ore and carbon in the proportion required for reduction and carbonization of the metal and with another charge for producing metal relatively high in carbon consisting of a solidified mixture of oxide ore and carbon in the proportion required for reduction and carbonization of the metal and regulating the carbon to the percentage desired in the metal produced through proportioning the two charges relatively to each other.

6. A direct reduction process for producing carbon binding metal or metal alloy by charging a furnace with one charge for producing metal low in carbon consisting of a solidified mixture of oxide ore and carbon in the proportion required for reduction and carbonization of the metal and with another charge consisting of oxide ore and carbon in excess over proportion required for reduction and carbonization of the metal and regulating the carbon to the percentage desired in the metal produced through proportioning the two charges relatively to each other.

7. A direct reduction process for producing carbon binding metal or metal alloy by charging an electric furnace with one charge consisting of a solidified mixture of oxide ore and carbon in the proportion required for reduction and carbonization of the metal and with another charge, deposited close to the electrode and onto the slag bath, containing relatively higher percentage of carbon and regulating the carbon to the percentage desired in the metal produced, through proportioning the two charges relatively to each other.

8. A direct reduction process for producing carbon binding metal or metal alloy by charging a furnace with one charge consisting of a solidified mixture of oxide ore and carbon in the proportion required for reduction and carbonization of the metal and with another charge containing relatively higher percentage of carbon and regulating the carbon to the percentage desired in the metal produced, through proportioning the two charges relatively to each other, and thereafter further regulating the percentage of carbon more accurately through carbonization of the metal.

9. A direct reduction process for producing carbon binding metal or metal alloy by charging a furnace with one charge consisting of a solidified mixture of oxide ore and carbon in the proportion required for reduction and carbonization of the metal and with another charge containing relatively higher percentage of carbon and regulating the carbon to the percentage desired in the metal produced, through proportioning the two charges relatively to each other, and thereafter tapping the metal produced and by further regulating the percentage of carbon more accurately through carbonization of the metal.

10. A direct reduction process for producing carbon binding metal or metal alloy by charging a furnace with one charge for producing iron, containing less than 0.10 per cent carbon, consisting of a solidified mixture of iron oxide ore and carbon in the proportion required for reduction and carbonization of the metal and with another charge for producing pig iron, consisting of a solidified mixture of iron oxide ore and carbon in the proportion required for reduction and carbonization of the metal and regulating the carbon to the percentage desired in the metal produced, through proportioning the two charges relatively to each other.

11. A direct reduction process for producing carbon binding metal or metal alloy by charging an electric furnace with one charge consisting of a solidified mixture of oxide ore and carbon in the proportion required for reduction and carbonization of the metal and with another charge containing relatively higher percentage of carbon and regulating the carbon to the percentage desired in the metal produced, through proportioning the two charges relatively to each other and thereafter deoxidizing the metal produced through charging with a solidified mixture of finely divided oxide ore of a deoxidizing metal and finely divided carbonaceous material in the proportion required for reduction of said metal.

12. A direct reduction process for producing carbon binding metal or metal alloy by charging a furnace with one charge consisting of a solidified mixture of oxide ore and carbon in the proportion required for reduction and carbonization of the metal, tapping wholly or partly the slag, thus formed, and charging with another charge containing relatively higher percentage of carbon and regulating the carbon to the percentage desired in the metal produced, through proportioning the two charges relatively to each other.

13. A direct reduction process for producing carbon binding metal or metal alloy from ore rich in phosphorus by charging a furnace with one charge consisting of a solidified mixture of oxide ore, rich in phosphorus and carbon in the proportion required for reduction and carbonization of the metal, tapping wholly or partly the slag, thus formed, and charging with another charge containing oxide ore, lower in phosphorus, and a relatively higher percentage of carbon and regulating the carbon to the percentage desired in the metal produced, through proportioning the two charges relatively to each other.

In testimony whereof we affix our signatures.

HENNING GUSTAV FLODIN.
EMIL GUSTAF TORVALD GUSTAFSSON.